United States Patent [19]
Ku

[11] Patent Number: 5,567,163
[45] Date of Patent: Oct. 22, 1996

[54] TALKING BOOK

[76] Inventor: Suey Ku, 6th Floor, #1 Lane 60, Ning-An St., Taipei, Taiwan

[21] Appl. No.: 494,685

[22] Filed: Jun. 26, 1995

[51] Int. Cl.⁶ .................................................. G09B 5/06
[52] U.S. Cl. ........................................................ 434/317
[58] Field of Search .................................... 434/317, 318, 434/308, 309

[56] References Cited

U.S. PATENT DOCUMENTS

| | | | |
|---|---|---|---|
| 2,936,342 | 5/1960 | Kallmann | 434/317 X |
| 3,641,684 | 2/1972 | Paige . | |
| 3,883,146 | 5/1975 | Johnson et al. | 434/318 X |
| 4,021,932 | 5/1977 | Lipps . | |
| 4,778,391 | 10/1988 | Weiner . | |
| 4,884,972 | 12/1989 | DeSmet . | |
| 4,990,092 | 2/1991 | Cummings . | |
| 5,368,488 | 11/1994 | Gentile . | |
| 5,374,195 | 12/1994 | McClanahan . | |

FOREIGN PATENT DOCUMENTS 3115968  11/1982  Germany ................................ 434/309

Primary Examiner—Gene Mancene
Assistant Examiner—Jeffrey A. Smith
Attorney, Agent, or Firm—Jack C. Munro

[57] ABSTRACT

An amusement and educational audio visual apparatus consisting of what is commonly referred to as a talking book and a playback device adapted to be utilized in conjunction with any one of a plurality of different talking books. The talking book includes a front cover and a back cover with pages being mounted therebetween. Interiorly of the back cover or the front cover there is mounted a cassette tape within which is located a prerecorded continuous audio tape. A separate hand holdable playback device is to be lockingly engaged with the cassette. The playback device includes a slide switch which when moved from a deactivating to an activating position will result in playing of the audio tape contained within the cassette. With the slide switch in the activating position, the slide switch is locked. Disengagement of this lock is achieved by pressing of a manually pressable button contained within the slide switch which will permit the slide switch to be moved from the activating position to the deactivating position.

4 Claims, 2 Drawing Sheets

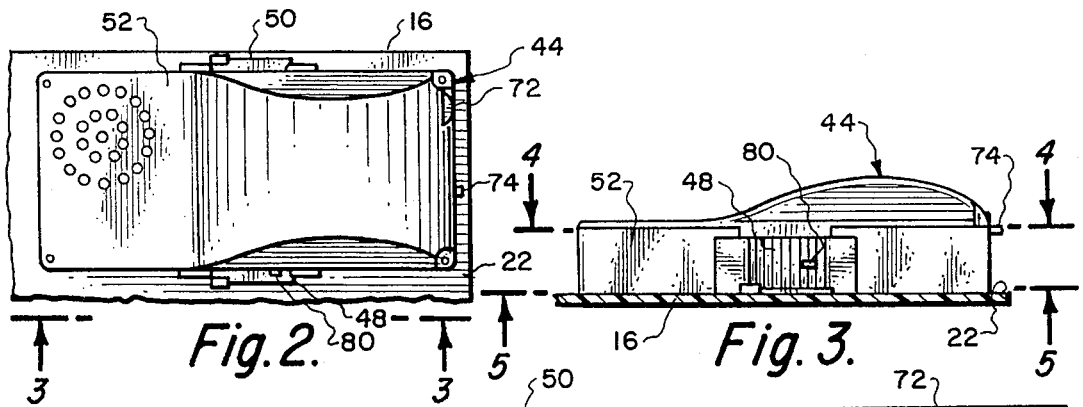
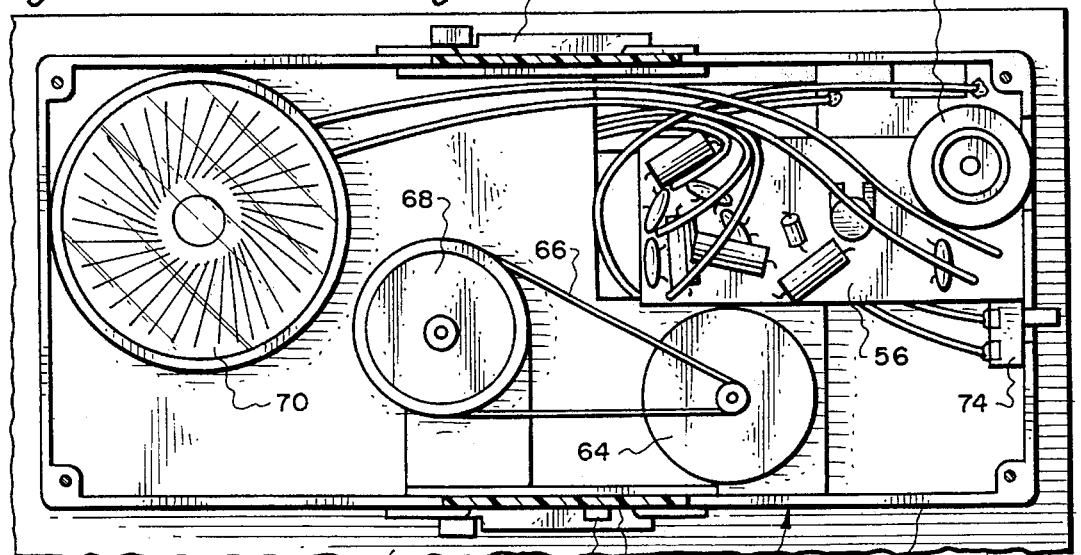
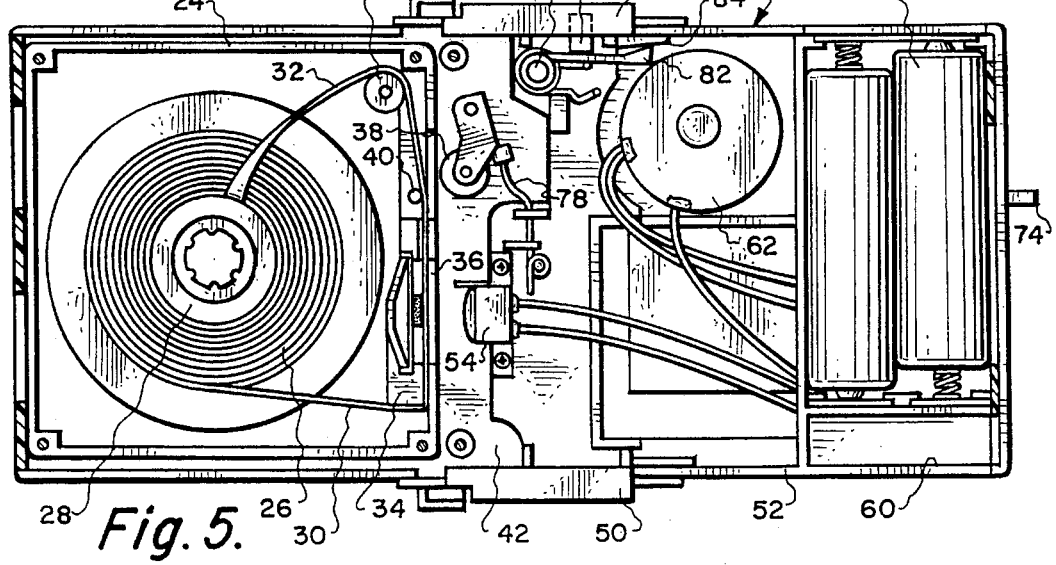

TALKING BOOK

BACKGROUND OF THE INVENTION

1) FIELD OF THE INVENTION

This invention relates to talking books having entertainment and education value and more particularly to a talking book which utilizes a separate audio playback player which when connected with a book will reproduce by sound the story of the book so the user can hear the story at the same time the user reads the story.

2) DESCRIPTION OF THE PRIOR ART

Talking books have long been known. Such talking books are in common use by children. It has been discovered that talking books provide audio visual entertainment and education for children. Audio visual education entails the simultaneous utilization of the visual and auditory faculties of a human. Simultaneous exercise of these faculties results in greater progress by the child in both reading and learning.

Various types of devices have been provided within the prior art to accomplish the audio visual exposure of children. One particular type of such device comprise expensive electronic teaching equipment intended for intensive use in schools and other institutions of learning. Another type of such devices in a simpler form would be the inclusion of phonograph records included in conjunction with printed material such as books. The user is to remove the phonograph record and play the phonograph record at the same time the book is read.

Also, within the prior art there are numerous forms of talking books. These books have tape cassettes of a conventional type or utilize an electronic chip that produces a synthesized sound. The tape or the chip is included within the book and is activated in some form by means of a playback device which may be separate from the book or may be included within the book.

One of the disadvantages of such prior art audio visual devices is that they have been relatively complex and complex devices are difficult for children to operate. Also, such devices have been relatively expensive and therefore not available to all children because of being financially limited only to children of affluent parents.

SUMMARY OF THE INVENTION

The primary objective of the present invention is to construct an audio visual apparatus which can be manufactured at very low cost and therefore sold to the ultimate consumer at a low cost which makes the audio visual device available to not only rich people but also to poor people.

Another objective of the present invention is to construct an audio visual device which can be easily operated by very young children.

Another objective of the present invention is to construct an audio visual device which is composed of few parts which thereby minimizes the possibility of a mechanical breakdown and therefore provides for an extended time period of usage.

The audio visual device of the present invention utilizes a book that resembles a conventional book having an inner cover and an outer cover with pages located therebetween. The size of the pages is substantially less than the size of the inner cover and the outer cover producing a head area on the inside surface of the inner cover and the outer cover which does not include any of the pages. Mounted within this head area is a cassette with this cassette including a prerecorded continuous cassette tape. This cassette is to be engageable with a separate playback device. It is to be understood that the playback device is to be usable with a wide variety of different cassettes and books. The playback device, when engaged with the cassette, includes a slide switch which is to be slid by the user from a deactivating position to an activating position thereby causing the cassette tape to be played. Mounted in conjunction with the slide switch is a manually pressable button. This button must be pressed in order to move the slide switch from the activating position to the deactivating position.

BRIEF DESCRIPTION OF THE DRAWINGS

FIG. 2 is a top plan view of the playback device utilized within this invention;

FIG. 3 is a side elevational view of the playback device included within this invention;

FIG. 4 is a cross sectional view taken along line 4—4 of FIG. 3 showing the internal components of the playback device of the present invention;

FIG. 5 is a cross sectional view through the playback device and the cassette with which it is connected showing the playback device in the deactivating position.

DETAILED DESCRIPTION OF THE PREFERRED EMBODIMENT

Figure 1:
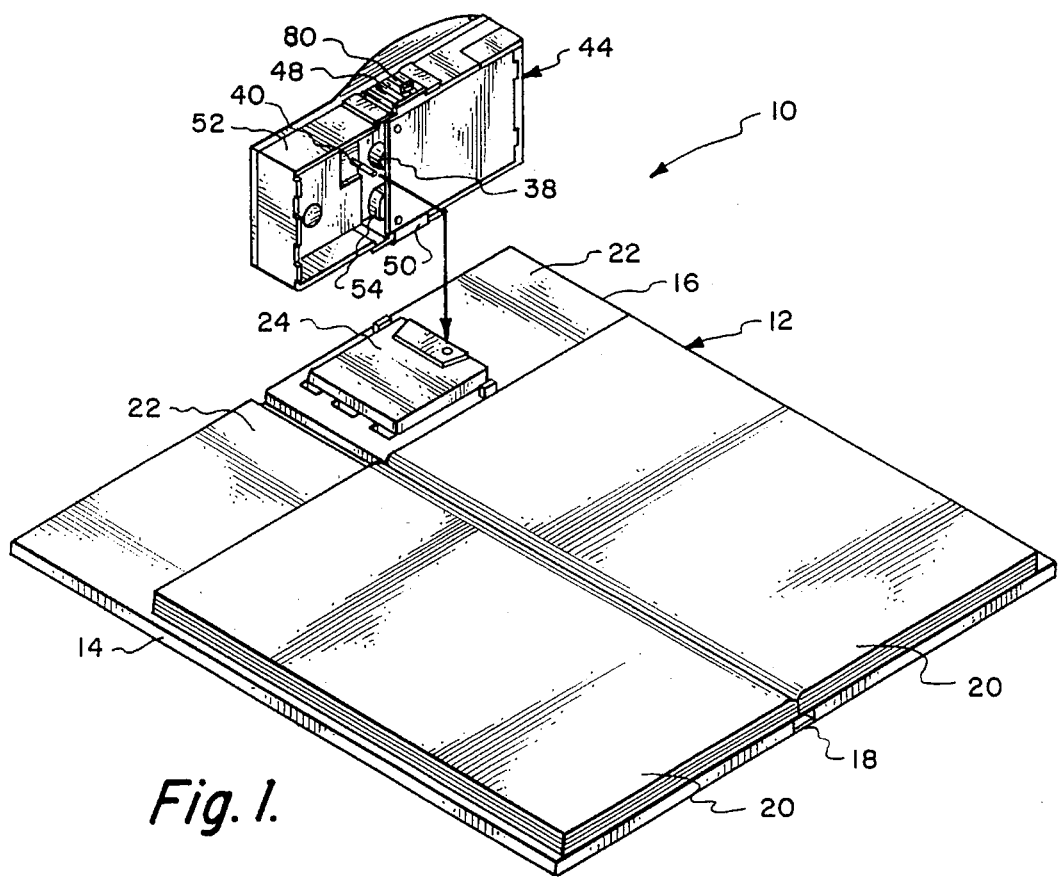
FIG. 1 is an isometric view of the audio visual device of the present invention which utilizes an audio playback device in conjunction with a conventional book hence producing what is commonly referred to as a talking book.

Referring particularly to the drawings there is shown the talking book 10 of the present invention. Talking book 10 includes a book 12 which is composed of a front cover 14 and a rear cover 16. The front covers 14 and 16 are normally constructed of a planar rigid material, usually a plastic or paper. The front cover 14 and rear cover 16 are shown to be of a basically rectangular configuration. However, it is to be understood that any desirable configuration for the covers 14 and 16 can be utilized.

The front cover 14 and rear cover 16 are connected together at a spine 18. The front cover 14 and rear cover 16 can be located in a closed position which will locate the covers 14 and 16 in juxtaposition. In between the covers 14 and 16 will be a stacked series of pages 20. The pages 20 are also connected to the spine 18. It is to be understood that the front cover 14 can be moved to an open position which will locate the front cover 14 in alignment with the rear cover 16 at which time the user may individually move the pages 20 to affect reading of the book 12.

It is to be noticed that within FIG. 1 the size of the pages 20 is substantially less than the size of the front cover 14 and the rear cover 16. It is to be noticed that the pages 20 are also rectangular in configuration and generally will be all of the same size although this is not mandatory. Also, the front cover 14 and rear cover 16 are the same size but, again, this is not mandatory. The portion of the inside surface of the front cover 14 and rear cover 16 that does not contain the pages 20 is defined as the head area 22. Fixedly mounted within this head area 22 is a cassette 24. Mounted within the cassette 24 is an endless audio tape 26. Audio tape 26 is wound on a reel 28. The reel 28 is rotationally supported within the housing of the cassette 24.

The audio tape 26 on the reel 28 forms an outer leg 30 which extends from the outermost layer of the tape 26 and an inner leg 32 which extends from the innermost layer of the tape 26. The outer leg 30 is conducted past a guide block 34 across a window 36 formed within the housing of the cassette 24. The outer leg 30 then passes between drive roller 38 and capstan 40. The idler pin 40 is mounted on the housing of the cassette 24 while the drive roller 38 is mounted on a plate 42. The plate 42 is part of the playback device 44. The outer leg 30 is then conducted around idler roller 46 and then becomes inner leg 32. Inner leg 32 is conducted through a groove (not shown) of the housing of the cassette 24 and then becomes the innermost layer of the tape 26 mounted on the reel 28. Actually, inner leg 32 is wound directly onto the reel 28. It is to be understood that the cassette 24 includes an endless tape 26 that has no end and no beginning. When the tape is completely played, it automatically just starts to replay as long as it is being played by the playback device 44.

The plate 42 of the playback device 44 is integrally connected at each end thereof to side plates 48 and 50. The side plates 48 and 50 are mounted in an abutting position on the exterior surface of the playback device housing 52. Mounted on the plate 42 is a transducer 54. The transducer 54 is electrically connected to a printed circuit board 56 mounted within the housing 52. Electrical energy for the printed circuit board 56 is supplied by means of batteries 58 which are mounted within battery compartment 60 within the housing 52. The batteries 58 not only drive the transducer 54 but also drive the motor 62. The motor 62 rotates drive wheel 64 with a belt 66 being mounted on the drive wheel 64. The belt 66 is mounted on driven wheel 68. Driven wheel 68 operatively rotates the capstan 40.

Also electrically connected to the printed circuit board 56 is a speaker 70. Also mounted on the printed circuit board 56 is a volume control knob 72. An on/off switch 74 is utilized to activate the playback device 44. The plate 42 is to be movable between a retracted position shown in FIG. 5 to an extended position shown in FIG. 6. Movement of the plate 42 is accomplished by means of a slide mechanism referred to generally as a slide switch with the user being able to slide side plates 48 and 50 on the housing 52 from the deactivating position to the activating position as is represented by arrow 76 in FIG. 6. It is also understood that the plate 42 is capable of being moved from the activating position shown in FIG. 6 to the deactivating position shown in FIG. 5.

Figure 6:
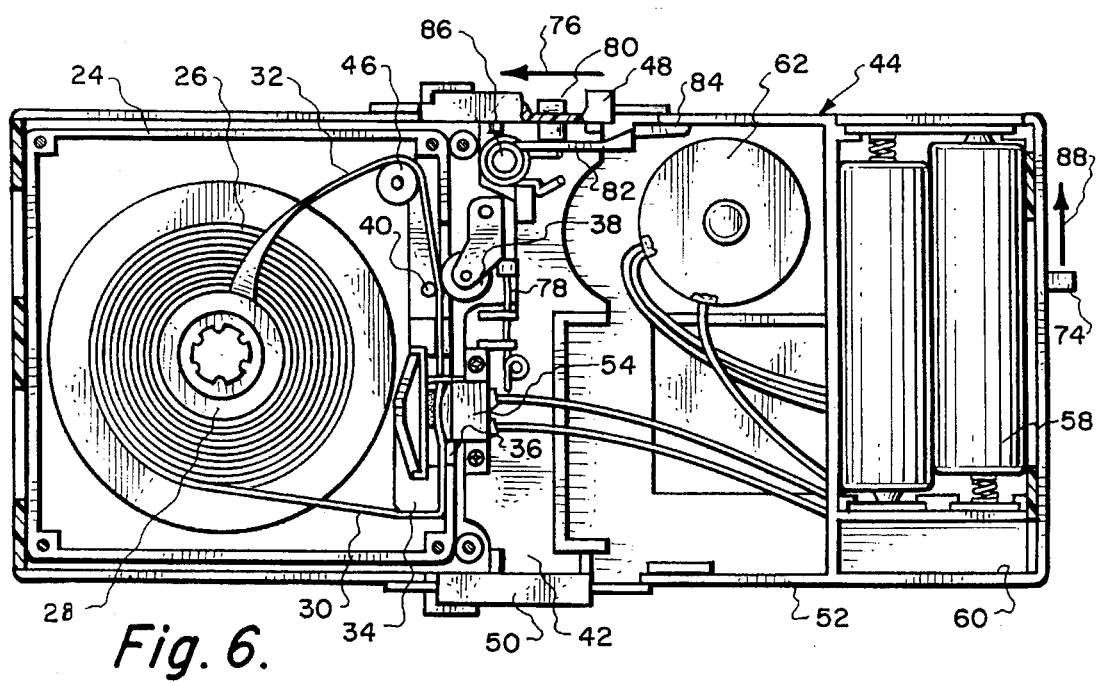
FIG. 6 is a view similar to FIG. 5 but showing the playback device in the activating position.

When the plate 42 is in the activating position shown in FIG. 6, the transducer 54 presses against the audio tape 26 26 that is conducted past the window 36. The transducer 54 then picks up the signal from the tape 26. This picked up signal is transmitted through the printed circuit board 56 and then is reproduced by sound from the speaker 70. With the plate 42 in the activating position, the tape 26 is moved by the rotation of capstan 40 which presses against the outer leg 30 of the tape 26 which is being pressed against the drive roller 38. The drive roller 38 is biasingly mounted by spring member 78 which exerts a continuous bias snugly retaining the outer leg 30 in contact with capstan 40. In essence, the capstan 40 unwinds the tape 26 and at the same time rewinds the tape 26 back on the reel 28.

When the plate 42 has been moved into the activating position shown in FIG. 6, it is desired that this plate 42 is locked in this position. For that purpose there is incorporated within side plate 48 a button 80. This button 80, though mounted within the confines of the side plate 48, is actually separate from the side plate 48 and must be pressed from its outer position shown in FIG. 6 to its inner position shown in FIG. 5 in order to affect movement of the plate 42 from the extended position shown in FIG. 6 to the retracted position shown in FIG. 5. When the plate 42 is in the extended position shown in FIG. 6 and the button 80 is in its outwardly extended position, deflectable member 82 is positioned so the head of the member 82 abuts against protuberance 84 mounted on the inside wall surface of the housing 52. This deflectable member 82 82 is mounted on a pin 86 which is also mounted on the plate 42. The deflectable member 82 actually resembles a spring which is wound on the pin 86 with this spring exerting a continuous bias tending to locate the deflectable member 82 in the position shown in FIG. 6 which would place the deflectable member in interference with the protuberance 84 and prevent movement of the plate 42 from the extended position shown in FIG. 6. When the user desires to deactivate the play-back device 44, the user needs to press button 80 which will deflect the deflectable member 82 and disengage such from the protuberance 84. This will then permit the plate 42 to be moved from the extended position to the retracted position and thereby deactivate the playback device 44. The transducer 54 will be disconnected and spaced from the outer end 30 of the audio tape 26 with the result that the drive roller 38 will be similarly displaced from the outer leg 30 with the result that rotation of the capstan 40 will not cause the audio tape 26 to be rotated on the reel 28. The user can then shut off the supply of electrical energy to the motor 62 by moving of switch 74 to the position shown in FIG. 5. When the switch 74 is moved in the direction of arrow 88 shown in FIG. 6, the motor 62 will be operatively driven which in turn rotates the capstan 40.

It is to be understood that the user, after having deactivated the playback device 44, can disengage such from the cassette 24 and is capable of reconnecting the playback device 44 with another cassette 24 of another book 12. In other words, the same playback device 44 can be utilized to play an endless number of cassettes 24 of an endless number of books.

What is claimed:

1. In combination with a book that is movable from a closed position to an open position, said book having a pair of outer covers with a plurality of pages located therebetween, said outer covers being connected at a spine, said outer covers having inner surfaces which are located in juxtaposition when said book is closed, said inner surfaces being in substantial alignment when said book is open, an audio player apparatus connected to said book, said audio player apparatus comprising:

said outer covers being larger in size than said pages forming a head area not occupied by said pages, a cassette fixedly mounted on one of said inner surfaces at said head area, said cassette including a prerecorded continuous audio tape; and a separate, hand holdable, playback device, said playback device including a switch assembly manually movable between an activating position and a deactivating position, with said switch assembly in said deactivating position said playback device being capable of being moved into engagement or moved out of engagement with said cassette, with said playback device in engagement with said cassette said switch assembly to be movable to said activating position which results in playing of said audio tape.

2. The combination as defined in claim 1 wherein:

said switch assembly comprising a slide switch.

3. The combination as defined in claim 2 wherein:

said switch assembly includes a locking means which locks said playback device in said activating position.

4. The combination as defined in claim 3 wherein:

said locking means including a separate manually pressable button mounted within said slide switch.

* * * * *